(12) United States Patent
Roen

(10) Patent No.: US 11,788,754 B2
(45) Date of Patent: Oct. 17, 2023

(54) ENVIRONMENTAL MONITORING SYSTEM

(71) Applicant: Wayne Roen, River Falls, WI (US)

(72) Inventor: Wayne Roen, River Falls, WI (US)

(73) Assignee: Wayne Roen, River Falls, WI (US)

(*) Notice: Subject to any disclaimer, the term of this patent is extended or adjusted under 35 U.S.C. 154(b) by 173 days.

(21) Appl. No.: 16/921,342

(22) Filed: Jul. 6, 2020

(65) Prior Publication Data

US 2020/0408429 A1 Dec. 31, 2020

Related U.S. Application Data

(62) Division of application No. 15/948,691, filed on Apr. 9, 2018, now Pat. No. 10,704,798.

(51) Int. Cl.
*F24F 11/39* (2018.01)
*F24F 11/58* (2018.01)
(Continued)

(52) U.S. Cl.
CPC .............. *F24F 11/39* (2018.01); *B01D 29/13* (2013.01); *B01D 35/1435* (2013.01);
(Continued)

(58) Field of Classification Search
CPC .... C02F 1/008; C02F 2209/008; B01D 29/13; B01D 35/1435; B01D 2201/56; B01D 46/00; B01D 46/0084; B01D 46/0086; B01D 46/0091; B01D 46/0093; B01D 46/442; B01D 46/448; B01D 46/46; G01N 1/2273; Y02B 30/70; B60H 3/06; B60H 2003/0683; F24F 11/39; F24F 11/63; F24F 11/58; F24F 11/32; F24F 11/33; F24F 11/30; F24F 2110/64; F24F 2110/70; F24F 2110/60; F24F 2110/62; F24F 2110/66; F24F 2110/68; F24F 2110/72;
(Continued)

(56) References Cited

U.S. PATENT DOCUMENTS 5,251,815 A 10/1993 Foye
6,703,930 B2 3/2004 Skinner
(Continued)

FOREIGN PATENT DOCUMENTS

CN 205202685 U 5/2016
CN 106016674 A 10/2016
(Continued)

OTHER PUBLICATIONS

WO 2017/030869 A1, Feb. 2017, Bonifas et al.*
(Continued)

*Primary Examiner* — Akash K Varma
(74) *Attorney, Agent, or Firm* — Merchant & Gould P.C.

(57) ABSTRACT

An fluid monitoring system can include a filter having an upstream face and a downstream face and defining a form factor, a sensor package arranged within the form factor of the filter to detect at least one quality factor of a surrounding medium, a transmitter electronically coupled to the sensor package and including an antenna for autonomous wireless transmission of the detected fluid quality information, and a power subsystem coupled to the sensor package and the transmitter to provide access to continuous electrical power thereto.

9 Claims, 14 Drawing Sheets

(51) Int. Cl.
  *F24F 11/63* (2018.01)
  *B01D 29/13* (2006.01)
  *B01D 35/143* (2006.01)
  *C02F 1/00* (2023.01)
  *F24F 110/64* (2018.01)
  *F24F 110/62* (2018.01)
  *F24F 110/70* (2018.01)
  *F24F 110/60* (2018.01)

(52) U.S. Cl.
  CPC .............. *C02F 1/008* (2013.01); *F24F 11/58* (2018.01); *F24F 11/63* (2018.01); *B01D 2201/56* (2013.01); *C02F 2209/008* (2013.01); *F24F 2110/60* (2018.01); *F24F 2110/62* (2018.01); *F24F 2110/64* (2018.01); *F24F 2110/70* (2018.01)

(58) Field of Classification Search
  CPC .............. F24F 2110/74; F24F 2110/50; F24F 2110/65; F24F 2110/76; F24F 3/16; F24F 3/1603
  USPC .......................................................... 210/103
  See application file for complete search history.

(56) References Cited

U.S. PATENT DOCUMENTS

| | | | |
|---|---|---|---|
| 6,894,620 | B2 | 5/2005 | Reinhardt et al. |
| 9,593,861 | B1* | 3/2017 | Burnett .................... F24F 11/30 |
| 10,363,509 | B2 | 7/2019 | Arthur et al. |
| 2004/0112273 | A1 | 6/2004 | Thoede et al. |
| 2007/0013534 | A1 | 1/2007 | DiMaggio |
| 2007/0277592 | A1* | 12/2007 | Johansson .............. B01D 46/10 73/38 |
| 2008/0033653 | A1 | 2/2008 | Pabon et al. |
| 2011/0185895 | A1 | 8/2011 | Freen |
| 2013/0146052 | A1 | 7/2013 | Ding et al. |
| 2015/0032264 | A1 | 1/2015 | Emmons et al. |
| 2015/0033942 | A1* | 2/2015 | Zhang ................ B01D 53/0454 96/108 |
| 2016/0116181 | A1* | 4/2016 | Aultman .................. F24F 11/00 |
| 2016/0121251 | A1* | 5/2016 | Baek .................. B01D 46/0086 96/417 |
| 2017/0087499 | A1* | 3/2017 | Combs ............... G01N 33/0011 |
| 2017/0241964 | A1 | 8/2017 | Vereecken et al. |
| 2019/0309972 | A1 | 10/2019 | Roen |

FOREIGN PATENT DOCUMENTS

| | | | | |
|---|---|---|---|---|
| WO | WO 2017/030869 | A1 * | 2/2017 | .......... B01D 35/143 |
| WO | WO 2017030869 | A1 | 2/2017 | |
| WO | 2017146633 | A1 | 8/2017 | |
| WO | 2019199462 | A1 | 10/2019 | |

OTHER PUBLICATIONS

Zhang et al., "A Wind Energy Powered Wireless Temperature Sensor Node," *Sensors* 2015, 15, pp. 5020-5031—www.mdpi.com/journal/sensors.

Dee DePass, "3M launches Bluetooth filter," Star Tribune, Jan. 14, 2018 (3 pages)—available at https://www.pressreader.com/usa/star-tribune/20180114/283201558705183.

Daniel Cooper, "3M's HVAC air filter tells you when it needs replacing", CES 2018, Jan. 9, 2018 (11 pages)—available at https://www.engadget.com/2018/01/09/3ms-hvac-air-filter-tells-you-when-it-needs-replacing/?lrsc=86d16fea-0c34-498e-84ff-6ea0850fae9a&wt.z_ch=li&wt.z_mt=link&wt.mc_id-Elevate.

International Search Report and Written Opinion, dated Jul. 3, 2019, 9 pages.

Extended European Search Report issued in international application No. 19785930.9, dated Mar. 23, 2022.

* cited by examiner

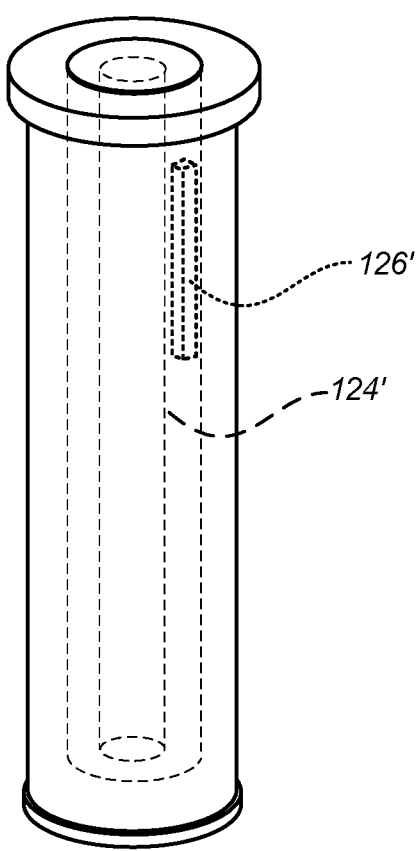 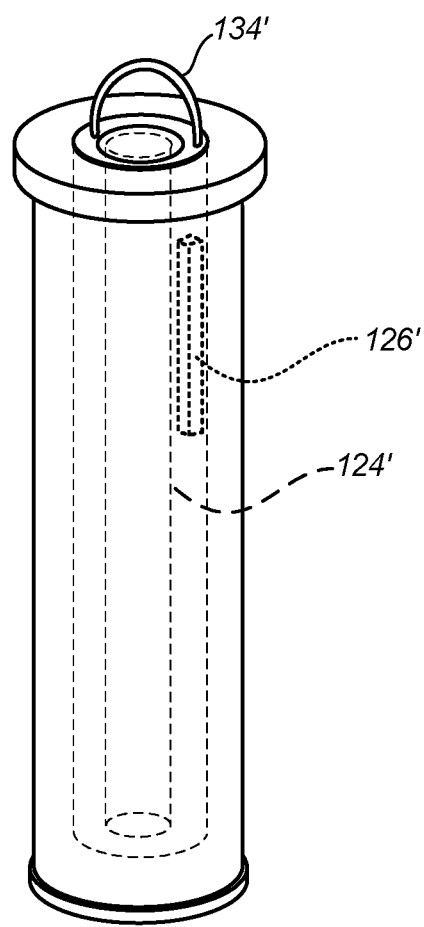
FIG. 4A  FIG. 4B

ENVIRONMENTAL MONITORING SYSTEM

RELATED APPLICATIONS

This application is a division of application Ser. No. 15/948,691, filed Apr. 9, 2018, now U.S. Pat. No. 10,704,798, the contents of which are hereby fully incorporated herein by reference.

TECHNICAL FIELD

Embodiments described herein relate to systems and methods for detecting and handling information related to various fluid quality and other indoor environmental factors. For example, environmental indoor air quality factors can be detected in conjunction with operation of an HVAC system, in embodiments, and can incorporate sensors to determine such quality factors and communicate the related information to HVAC monitoring and control systems and to end users via telemetry.

BACKGROUND

Recently, there has been an increase in the societal awareness of the impacts of degraded indoor environmental quality factors, including but not limited to internal air quality and consumable water quality. Smog clouds and pollution that affect quality of life and endanger health have prompted increased governmental regulation on emitters of pollution such as power plants. International agreement has been reached that particulates and gaseous emissions pose a serious threat to humans. At a local and individual level, some large cities have implemented restrictions on driving and burning during periods in which particulate matter or smog reach dangerous levels. In many cities where particulate matter reaches particularly high levels, the use of personal disposable respirators is common.

Water quality likewise can be affected by polluters including but not limited to industry, farming, residential wastewater, and storm drain runoff. The effects of polluted water and air can include higher risk of premature death among the elderly, birth complications, increases in respiratory disorders or onset of asthma attacks, and other diseases or adverse health effects.

Against this backdrop, many homes, offices, and other buildings seek to improve the quality of their internal environmental factors such as air and water. Even in areas that do not suffer from high pollution levels, indoor air quality can be improved by removing irritants such as pollen or pet dander. The primary mechanism for removing these irritants is the use of ducted, recirculating Heating Ventilation and Air Conditioning (HVAC) systems.

HVAC is the technology of indoor and vehicular environmental comfort. Its historic goal is to provide thermal comfort and acceptable indoor air quality. HVAC is an important part of residential structures such as single-family homes, apartment buildings, hotels and senior living facilities, medium to large industrial and office buildings such as skyscrapers and hospitals, on ships and submarines, and in automotive and marine environments, where safe and healthy air conditions are regulated with respect to temperature and humidity, using fresh air from outdoors.

Ventilating or ventilation (the V in HVAC) is the process of conditioning, exchanging or replacing air in a space to provide high indoor air quality. Ventilation facilitates temperature control, oxygen replenishment, and removal of moisture, odors, smoke, heat, dust, airborne bacteria, carbon dioxide, and other gases and particulates. Ventilation removes unpleasant smells and excessive moisture, introduces outside air, keeps interior building air circulating, and prevents stagnation of the interior air. Ventilation includes both the exchange of air to the outside as well as circulation and conditioning of air within the building. It is one of the most important factors for maintaining acceptable indoor air quality in buildings.

HVAC systems typically include a ducted plenum for providing air that has been treated to a premises. The HVAC system also includes a return air flow, which can be a second ducted plenum that receives air from the premises. The air received via the return plenum is often heated or cooled after passing through a filter. Conventional filters for HVAC systems (herein "furnace filters") are sized to fit within the duct corresponding to the return air plenum. Such filters collect particulates and are typically replaced periodically during operation of the HVAC system.

While limited attempts have been made to monitor specific aspects of air quality within an HVAC system (e.g., humidity monitoring, etc.) various technical, economic, and societal factors have historically provided obstacles to expansion of such monitoring to include other air quality factors. Systems developed to date have typically taken the form of hand-held air quality instruments, which are used by HVAC professionals to point-check (i.e., instantaneous, rather than continuous, monitoring) for a specific air quality factors (e.g., carbon monoxide). Other conventional systems include stand-alone air quality monitors, which can be placed in one location of a multi-room structure. An example of a stand-alone device is a smoke detector.

The systems described above are limited in that they take measurements at a precise location within the structure. Therefore, for critical detection (such as smoke alarms and carbon monoxide detection) multiple sensors are used throughout a premises. Furthermore, the systems described above are not designed for continuous, extended operation without power, either by direct wiring or frequent replacement of batteries. The systems described above are difficult to effectively implement throughout a complete multi-room structure and often require redundant sensors or expensive modifications to the HVAC system.

Another type of conventional device is an add-on to an HVAC system, which typically requires some mechanical modification of the system. For example, a humidity subsystem can be attached to operate in conjunction with an HVAC system. These systems are typically wired separately for power and sensing. In the example of a humidity subsystem, a humidifier and a set of sensors can be attached to the ducting of an existing HVAC system. The sensors can include, for example, a humidity sensor and a pressure sensor or airflow sensor. In operation, the sensors detect operation of the HVAC system and the need for additional moisture, and are powered to add humidity to the airstream as needed.

SUMMARY

A fluid quality monitoring system (FQM) can include a filter having an upstream face and a downstream face and defining a form factor, a sensor package to detect at least one fluid quality factor, a transmitter electronically coupled to the sensor package and including an antenna for autonomous wireless transmission of the detected at least one fluid quality factor, and a power subsystem coupled to the sensor package and the transmitter to provide access to continuous electrical power thereto. The filter could be an HVAC filter, in embodiments.

The system can include a processor or other logic-implementation system to operate the sensor package intermittently and reduce power drawn by the sensor package. The filter can define a border of a cavity having a size related to the sensor package, such that the sensor package occupies a space within the form factor defined by the filter. The cavity can be in the interior of the HVAC filter. The fluid quality detected can correspond to environmental indoor air quality factors including one or more of odors, smoke, heat, dust, airborne bacteria, or carbon dioxide level, among others. The sensor package can be configured to be insertable and removable from the filter. The indoor air quality detection system can further comprise an alerting component subsystem to gather sensor data and report it, either autonomously or selectively, to a monitoring system. The alerting component can be configured to provide an alert when the sensor package detects an excess (or deficiency) of one of the environmental indoor air quality factors. The power subsystem can include an energy harvesting element. The power subsystem can include a battery. The upstream face and the downstream face can define a fluid flow direction (e.g., air), and the sensor package can extend primarily along a plane orthogonal to the flow direction. Alternatively, the sensor(s) or device can extend at least partially along the orthogonal plane sufficient to sample the incident airflow for a desired environmental quality factor or set of environmental quality factors.

According to another embodiment, a kit for fluid quality monitoring is disclosed that includes a sensor package as described above. In some embodiments, the fluid monitoring kit includes a filter for a heating, ventilation, and air-conditioning (HVAC) or water quality monitoring (WQM) system, the filter defining a form factor, a sensing system configured to be arranged within the form factor. The sensing system can include a sensor configured to detect at least one fluid quality factor, a transmitter electronically coupled to the sensor package and including a subsystem for autonomous transmission of the detected at least one fluid quality factor, and a power subsystem coupled to the sensor package and the transmitter to provide access to continuous electrical power thereto. The kit can further include instructions for configuring a networked device to communicate with the transmitter.

The filter can define a border of a cavity having a size related to the sensor package, such that the sensor package occupies a space within the form factor defined by the filter. The cavity can be in the interior of the filter. The environmental indoor air quality factors can include one or more of odors, smoke, heat, dust, airborne bacteria, or carbon dioxide level. The sensor package can be configured to be insertable and removable from the filter. The kit can further include an alerting component configured to provide an alert when the sensor package detects an excess of one of the environmental indoor air quality factors. The power subsystem can include an energy harvesting element. The power subsystem can include a battery. The instructions for configuring a networked device to communicate with the transmitter can include instructions for downloading an app to a mobile device. The antenna can be configured for use on a wireless local area network. The antenna can be configured for use on a mesh network.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIGS. 4A and 4B are perspective transparent views of filters according to embodiments including FQM subsystems for a water filtration system.

Figure 1A:
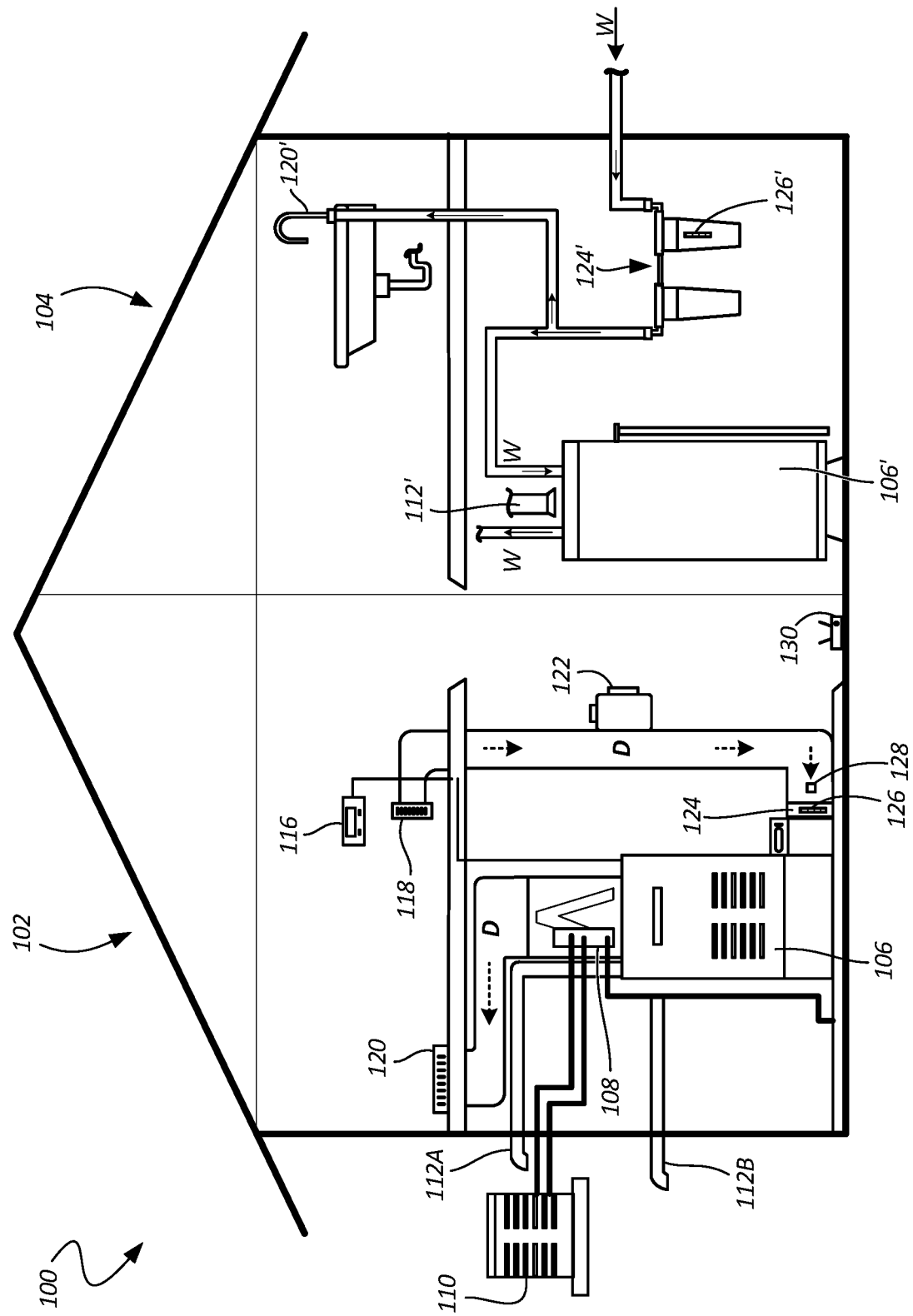
FIGS. 1A-1C are schematic and detailed views of a premises having filtered air and water systems according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

As described herein, improved systems and methods for monitoring environmental conditions can be implemented via low-cost, miniaturized computational, control, sensor, power, and telemetry components. In embodiments, these systems can be placed within an HVAC system, or in any other fluid handling system such as a potable water supply to a structure, a coolant circuit, a recirculation pump for a pool, or other system with supply and return sides.

According to embodiments, users can receive an increased level of information related to their day-to-day exposure to internal air quality metrics such as humidity, particulate content, exposure to volatile organic compounds (VOC's) and other chemicals, and detection of dangerous materials such as radon or carbon monoxide. These improvements address increasing end user expectations for information affecting their day-to-day lives, which has already prompted changes in other areas such as thermostats and home security systems.

Improvements in battery technology, energy harvesting, and energy conservation components and techniques such as use of low-power system componentry and selective operation of the sensors, and energy harvesting enable extended operation of embodiments described herein, even in locations where direct-wired AC power is not readily accessible. The components that make up the systems described herein include miniaturized components for sensing, computation, control, and telemetry that are generally low-cost, configured in new ways to gather unique data without requiring expensive or cumbersome redundancies or modifications to existing HVAC or other systems. Rather, use of cloud computing and wireless communication can facilitate transfer of information to an end user via a mobile device, personal computer, smart home interface device, or other interface.

In the context of an HVAC system, these components can be arranged within the existing form factor of the HVAC filter. Through use of modern battery technology, energy harvesting, energy conservation techniques, and low-power system componentry, the need for special installation of AC power is eliminated, while extended operation of the Intelligent Indoor Air Quality Monitoring (IIAQM) system takes place. In embodiments, this type of FQM system can have components that are available at low cost, such that they are disposable along with the filter at the time of filter replacement. Alternatively, the components can be contained within a module that can be retrieved from a used filter and inserted into a new filter as it is placed into the HVAC system. In these embodiments, the module can have a specific mechanical design for easy mating of the HVAC filter and the FQM system. Replaceable filter technology is not, however, limited to HVAC systems, and similar systems can be implemented in other fluid-monitoring contexts, including but not limited to water filtration.

Powering such a system can be achieved through a combination of battery technology, energy harvesting, energy conservation techniques, and low-power system componentry. In embodiments, no external electrical power supply is required to operate the system. Rather, by taking advantage of predictable air flow through the system (such as an HVAC filter in which the IIAQM system is arranged), a battery can be charged or the IIAQM system can be directly powered through harvesting the energy of that flowing air.

In embodiments, sophisticated energy conservation techniques can be employed such as running the IIAQM in a low-power "sleep" mode the majority of the time, and "awakening" the device for air quality sampling selectively and intelligently (e.g., upon detection of air flow, or on a user-configurable timer for sampling, among others). In one embodiment, operation of the system can "awaken" the FQM upon detection of air flow to begin sensor sampling.

In embodiments, a modular design approach for the IIAQM allows for a wide variety and number of specific sensors to be incorporated (i.e., envision a "backplane" which accepts a wide variety of sensors through a common, defined electronic interface). Sensor types are envisioned to include (but not limited to): smoke particles (replacing or augmenting existing stand-alone smoke detectors), carbon monoxide, carbon dioxide, combustible gases, radon, mold, volatile organic compounds (VOCs), oxygen, humidity, fluid velocity, fluid temperature, pressure (such as barometric pressure), particulate matter (including particulates as a function of particulate size), ammonia, ozone, hydrogen sulfide, hydrogen cyanide, nitrogen monoxide, nitrogen dioxide, ethylene oxide, hydrochloric acid, formaldehyde, airborne bacteria or other disease vectors, and other airborne chemical or biological compounds, or air conditions that might constitute a danger to indoor air quality or be a predictor to dangerous air quality situations. A modular approach means that an FQM system could be uniquely configured with a set of sensors that are most relevant to the specific environment being monitored. The system could be configured either at the point of manufacture, or by the end user, according to embodiments, or various aspects could be configured both before and after the final sale of the system.

In embodiments, the systems and methods described herein are capable of implementing local data-logging of sensor readings and connecting via telemetry to personal mobile devices, personal computer systems, HVAC monitoring and control systems, etc. for transferring information and making it actionable.

In embodiments, the systems and methods described herein are capable of action-logging within the IIAQM to keep track of specific events (e.g., date the HVAC filter was changed, measure of airflow volume over time or cumulative PPM passed through the filter, or other data that may be used as a reportable indicator/predictor for when a filter should be changed for best efficiency and economy).

In embodiments, the systems and methods described herein are capable of linking information analytics (of collected IIAQM data) to prompt an action. For example, embodiments can send alerts of exceeded thresholds to an end user or HVAC monitoring and control system, automate ordering of replacement HVAC filters or other products within a fluid handling system, report information gathered over time (e.g., radon levels over a time period), or prompt a user for suggested next steps to a detected air quality issue (e.g., providing the contact information of radon abatement professionals for advanced testing and corrective action in the event the IIAQM detects a radon gas issue).

Combining FQM data with relevant data from other sources can improve analytics. For example, outdoor air quality measurements can be combined with HVAC measurements to compare or add data from carbon monoxide detectors, gas detectors, or smoke detectors in a structure corresponding to the HVAC system, in embodiments. Another example, an indication of high levels of particulate matter inside a residence can be compared with an indication of particulate matter outside of the residence to determine whether, despite elevated overall levels of particulate matter, the HVAC system is operating within expected parameters, or whether the actions to be taken are relative to factors outside the structure or inside the structure.

Although embodiments are described herein with respect to HVAC systems or water filtration systems, it should be understood that other fluid quality measurements could be made using other embodiments that are configured for use with those fluids. As shown below, air quality monitoring devices (i.e., IIAQM devices) can be arranged in, adjacent to, or at a distance from a furnace filter, whereas devices for use in residential water monitoring (i.e., water quality monitoring (WQM) devices) are arranged within an annular water filter. Other filters such as those for use in automotive air or oil monitoring, or for emissions monitoring, can be sized and shaped such that they can be mounted within or on conventional structures without significant retrofitting. Thus fluid monitoring is improved without requiring costly and time-consuming modifications to existing systems.

FIG. 1A is a schematic view of a premises 100 including a HVAC system 102 and a water system 104. Premises 100 could be a home, a business, or any other facility that is heated or cooled by forced air, and that also includes plumbed water. Although premises 100 includes both forced air heating and cooling as well as a plumbed water system, it should be understood that in alternative embodiments a facility similar to premises 100 could include only plumbed water (e.g., a public restroom or even a standalone device such as a water fountain) or alternative could include only an HVAC system (e.g., an office, warming house, or shop without a restroom or other plumbed water). Premises 100 includes both HVAC system 102 and water system 104 for ease of illustration and description of multiple embodiments that are usable in both air and water contexts. In still further embodiments, not depicted in FIG. 1, fluid quality monitoring (FQM) could be implemented in still other contexts, such as oil quality monitoring or any other fluid (gas or liquid) that is routed in a circuit.

HVAC system 102 includes air handler 106, which is coupled to ducts D. Air handler 106 includes an evaporator 108, which is operatively coupled to condenser 110. As such, air handler 106 can provide either heating (either through combustion, electrical resistive heating, or heat pumping, for example) or cooling. In alternative embodiments, HVAC system 102 need not include both heating and cooling functions, and could be operable in only one of these modes. Exhaust 112A and air intake 112B can be present in some embodiments in order to vent combustion gases from a heating system, but need not be present in all embodiments, such as those operating on electrical power. Additionally, in alternative embodiments ducts D may not be necessary, such as in the example of a ductless mini-split system or similar. In embodiments incorporating a duct D, HVAC system 102 includes a blower fan (not shown) that causes air to circulate throughout the premises 100 when the blower is operated, as indicated by the arrows on ducts D.

Thermostat 116 is operatively coupled to air handler 106, for example by a wired or wireless connection, to call for heating or cooling based on the temperature of premises 100. If, for example, thermostat 116 calls for cooling, air handler 106 can operate by cooling the air passing through ducts D, which draws air from return 118 and delivers the cooled air at register 120. Optionally, thermostat 116 can include a hygrometer to cause coincident operation of humidifier 122, or humidifier 122 can itself include a hygrometer or other humidity sensor to determine that air flow is occurring and that humidity is desired.

Within duct D is a filter 124 and FQM device 126. Optionally, duct D defines a window 128 adjacent to or near to FQM device 126. Conventional furnace filters are available that clean air passing through HVAC systems in order to clean the air both for the health and comfort of occupants of a corresponding premises, and also to prevent damage or buildup within a corresponding air handler. As such, similar to the embodiment shown in FIG. 1A, filters are often installed upstream of an air handler.

In various embodiments similar to the one shown in FIG. 1A, filter 124 can be coupled to, located nearby to, or even encompass FQM device 128. Filter 124 can be inserted or removed from duct D as described in more detail with respect to the other figures, below, but generally has a cross-sectional profile that matches with a cross-sectional profile of a door or other opening in duct D. In embodiments, filter 124 and FQM device 126 can, in combination, have a cross-sectional profile that matches that of a door or other opening, or alternatively filter 124 and FQM device 126 can be inserted into duct D separately, or through different apertures.

Window 128 can be an opening in duct D, or alternatively window 128 can be "transparent" for purposes of telemetry while still providing a mechanical barrier to prevent air from leaving the duct D. For example, window 128 can be a plastic component that will transmit better than duct D at frequencies in the range of common wireless communication systems such as Bluetooth, Zigbee, or WiFi. Window 128 need not be present in all embodiments of HVAC system 102, such as in systems where wired or wireless communication systems are incorporated to transmit signal from the inside of duct D to the outside of duct D. For example, a wire could pass through duct D to transmit signal that would not be able to pass through duct D wirelessly. A receiver can be positioned inside duct D, and the signal received at that receiver can be sent by wired connection to a location outside duct D, which could be a network or a transmitter or an antenna, in various embodiments. In some embodiments, wireless transmission can be conducted between two devices that are proximate.

In this specification, the term "proximate" when referring to wireless communication means that the two devices are within communication range, such that signal can be communicated from one device to another without an intervening signal booster or repeater. For example, a typical range for two "proximate" Bluetooth devices is about 30 feet, and a typical range for two "proximate" devices where one is a wireless WiFi router and the other is a WiFi node is about 300 feet. The distance that is considered "proximate" can be reduced in some circumstances, such as where an intervening structure (for example, a metal air duct) reduces the signal transmission distance of one or more of the devices. The devices could be any devices using standard wireless protocols, such as a wireless router, repeater, Internet of Things device, or mobile device, for example.

Figure 1B:
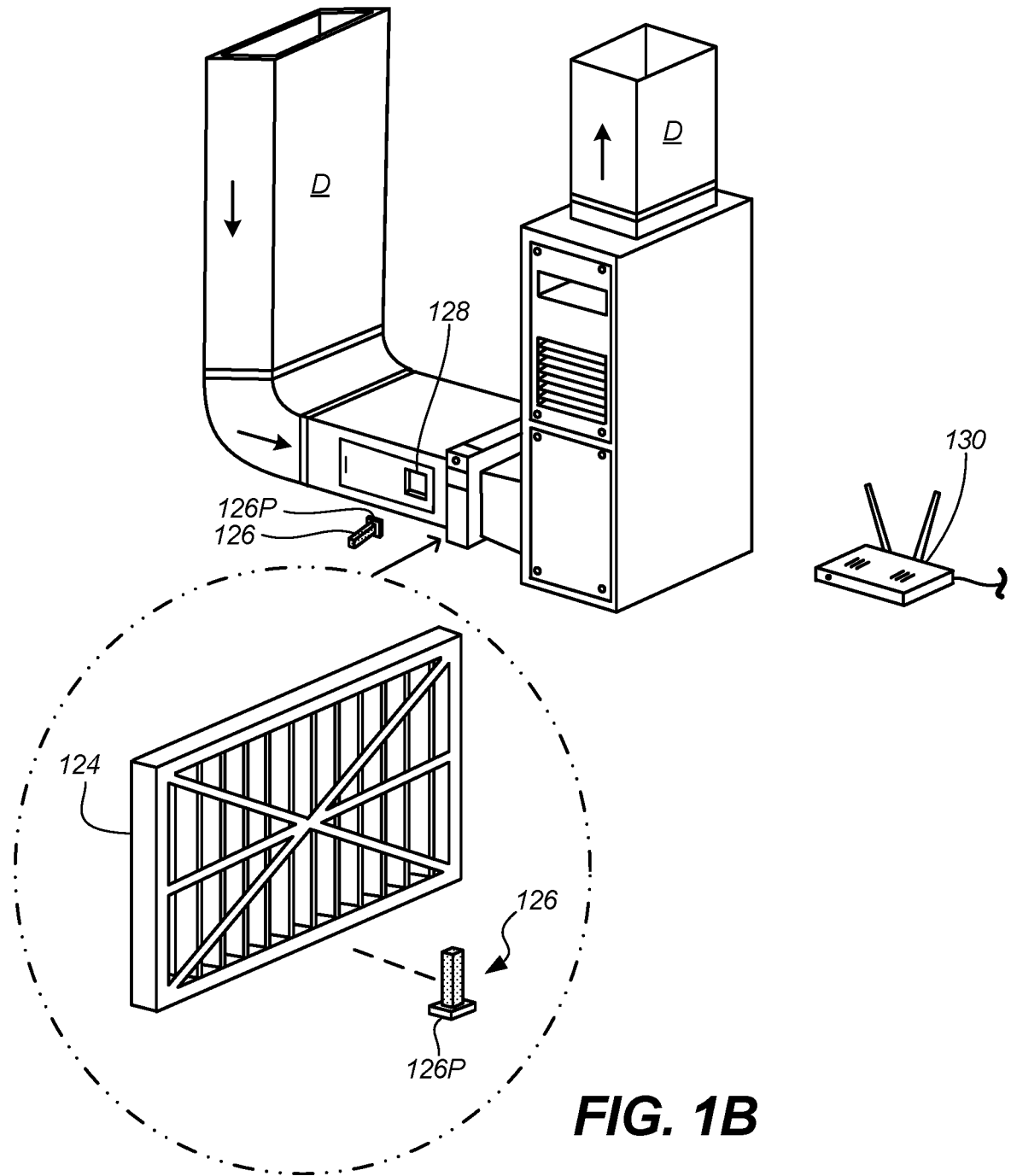

Wireless router 130 is arranged proximate to window 128, as shown in both FIGS. 1A and 1B. Alternatively, wireless router 130 could be arranged further from window 128, in embodiments, and FQM device 126 can transmit over a distance to wireless router 130 either directly or through wireless repeaters or wired connections. Furthermore, although wireless router 130 is shown as a WiFi router, in alternative embodiments wireless router 130 could be, for example, any communication device capable of receiving signal using a wireless transmission protocol. Some examples of such wireless protocols include mesh network nodes or hubs, Internet of Things nodes or hubs, or wireless communication devices configured to operate on Bluetooth, Z-Wave, Zigbee, WiFi, or combinations thereof, although it should be understood that other wired or wireless communications protocols could be used in alternative embodiments. More details regarding the telemetry or communications systems that could be used are described with respect to FIG. 6.

While the details regarding HVAC system 102 have been described in detail above, parallel and corresponding systems can be used in water system 104. For example, in lieu of an air handler 106 used in HVAC system 102, a water heater 106' can be used in water system 104. In lieu of FQM device 126 adjacent to filter 124 in a duct D as described with respect to HVAC system 102, FQM device 126' can be arranged adjacent to filter 124' in water line W in the water system 104. In embodiments where water system 104 includes a source of combustion (such as where water heater 106' is gas powered), exhaust system 112' can provide for egress of combustion gases similar to exhaust 112A described previously with respect to HVAC system 102. Faucet 120' can provide filtered, heated water similar to register 120 that can provide filtered, heated air.

Some distinctions are found between HVAC system 102 and water system 104. For example, while HVAC system 102 operates on a loop (i.e., air is supplied to and returned from the premises 100), water system 104 is not a closed loop. Rather, water system 104 typically receives water from a city water supply, well, or other clean water source, and the filtered water that is delivered at faucet 120' drains to a sewer, septic system, or other wastewater disposal system. In some embodiments a closed loop can be present even within a water system 104, such as recirculated greywater systems that recirculate water back to the supply (see, e.g., U.S. Pat. No. 4,828,709, which describes a shower that recirculates water through a filter to retain heat energy and reduce water usage).

Similarly, while FQM devices 126 and 126' perform similar functions, they may be structurally quite distinct. For example, FQM device 126' is resistant or impervious to water, whereas FQM device 126 may not be. Likewise, FQM device 126 can detect attributes that are important for monitoring in an HVAC system (such as particulate concentration, presence of VOC's, presence of carbon monoxide, odors, or particulate composition such as allergens) whereas FQM device 126' can detect attributes that are important for monitoring in a water system (such as presence of pathogens including *Legionella*, presence of lead or other heavy metals, pH, or mineral presence/water hardness).

Figure 1C:
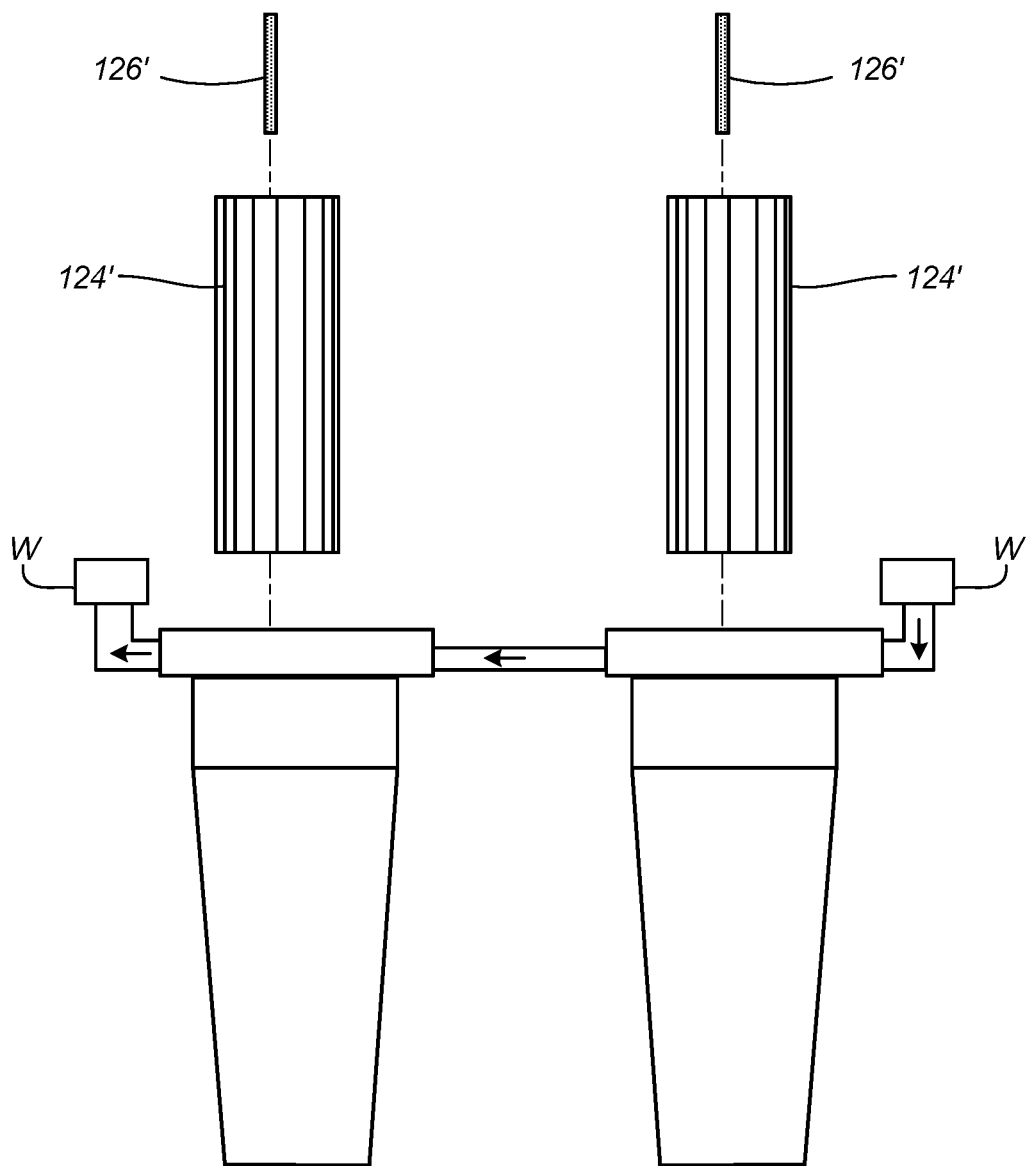

As shown in FIG. 1B, FQM device 126 for an HVAC system can be arranged on a panel 126P that engages with an aperture 128, in embodiments. Depending on the location of aperture 128 with respect to filter 124, FQM device 126 can be located in, adjacent to, or distant from filter 124. In the first type of embodiment, FQM device 126 can be inserted into filter 124 and fit within the form factor of filter 124, thereby providing information regarding filtered or unfiltered air, depending upon the side of filter 124 where FQM device 126 is installed. In embodiments, FQM device 126 can be installed downstream of filter 124, providing sensed information about the air that is delivered to premises 100. FIG. 1C is an exploded view of FQM device 126', which is present adjacent to filter 124' along a water line W.

Figure 2A:
FIGS. 2A-2I are detailed views of filters including fluid quality monitoring (FQM) systems, according to various embodiments.
Figure 2B:
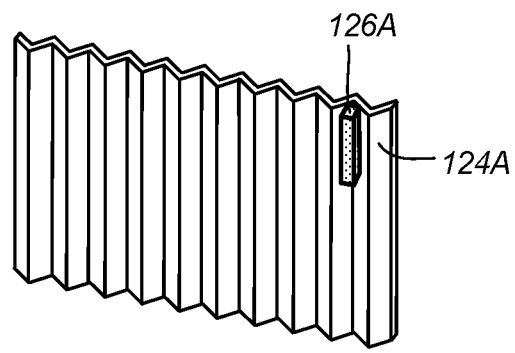

FIGS. 2A and 2B depict FQM device 126A adjacent to (or contained within) filter 124A. In FIGS. 2A and 2B, filter 124A is a pleated, thin filter, such as an electrets filter commonly used in an HVAC system. For clarity in the drawing, filter 124A is shown without supporting wire mesh or cardboard supports that are commonly associated with an HVAC filter.

Pleats are commonly included in HVAC filters such as electrets filters, in order to increase the filter's surface area. Filter 124A shown in FIGS. 2A and 2B includes pleats, such that the form factor of the filter 124A includes some empty space that is filled by the ambient environment. As used throughout this application and the claims, the term "form factor" when referring to an HVAC filter refers to the smallest rectangular prism in which that filter can be arranged. In some embodiments, the form factor of a filter (such as a water filter) can be something other than a rectangular prism. For example, the form factor of the water filter shown in FIG. 2H has an annular cross-section and defines a cylindrical toroid. While other shapes of filters may be usable in alternative embodiments and settings, in general furnace filters have a form factor that defines a rectangular prism such that they can be inserted into a corresponding duct that has a rectangular cross-section and a rectangular door or other access. As shown in FIG. 2B, the pleated shape of filter 124A leaves regions in which FQM device 126A can be arranged without sitting outside of the form factor of filter 124A.

In general, the filter defines an upstream face and the downstream face that define a flow direction. The pleats are arranged on the upstream and downstream sides of the filter 124A. The FQM sensor package 126A can extend primarily along a plane orthogonal to the flow direction, to maximize the exposure of the sides of sensor package 126A to the airflow. In embodiments, sensor package 126A could be positioned on either of the upstream side of the filter 124A or the downstream side of the filter 124A.

Figure 2C:
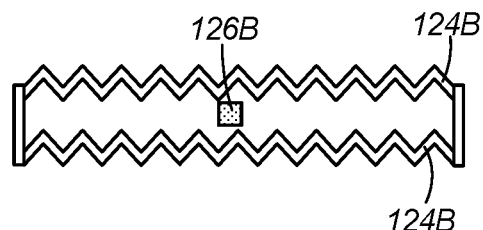
Figure 2D:
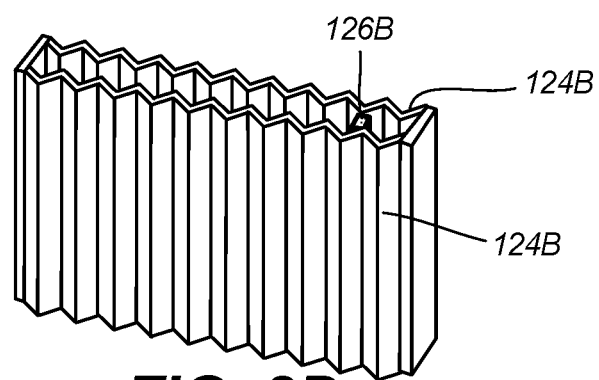

FIGS. 2C and 2D depict an alternative embodiment that includes a filter 124B that defines a cavity. FQM device 126B is arranged within the cavity. Filter 124B can be used in ducting systems that are suited for use with a thicker filter. For example, common filter sizes for use in HVAC systems can have a form factor of about 1" thickness (such as 16 inches by 25 inches by 1 inch, 16 inches by 30 inches by 1 inch, 20 inches by 25 inches by 1 inch, 18 inches by 30 inches by 1 inch, 22 inches by 22 inches by 1 inch, 24 inches by 24 inches by 1 inch, or 24 inches by 30 inches by 1 inch) or about 4" thickness (such as 16 inches by 25 inches by 4 inches, 20 inches by 20 inches by 4 inches, or 20 inches by 25 inches by 4 inches). It should be understood that in alternative embodiments, other form factors could be used. Especially in the thicker embodiments, such as 4 inch thick embodiments, a cavity can be more easily created within the filter 124B in order to house FQM device 126B.

Figure 2E:
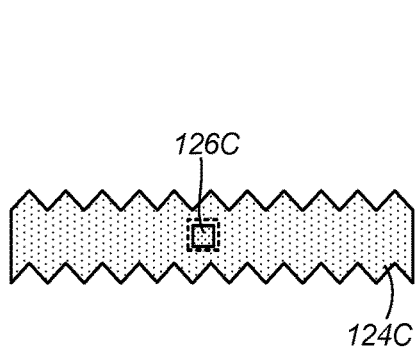
Figure 2F:
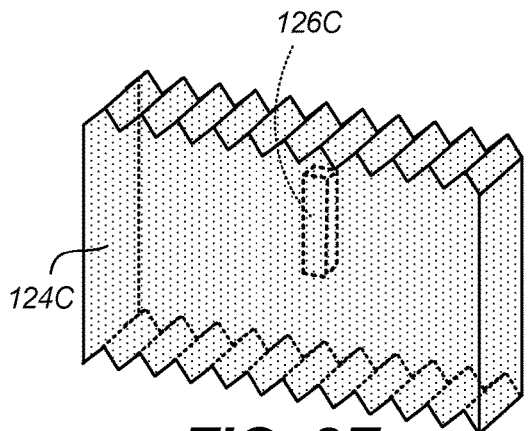

FIGS. 2E and 2F depict an alternative embodiment of filter 124C and FQM device 126C. In contrast to filter 124B and FQM device 124B described with respect to FIGS. 2C and 2D, filter 124C defines a void only large enough to contain FQM device 126C, rather than a larger cavity. This "filled in" version of the filter 124C requires air to pass through a relatively larger amount of filter media than the version of FIGS. 2C and 2D. In effect, in the version shown in FIGS. 2E and 2F, FQM device 126C is embedded within a surrounding bed of filter media such as a non-woven polymer. In some embodiments, the filter media can also include a gap or channel in order to position FQM device 126C within filter 124C. In alternative embodiments, FQM device 126 can be disposable, and can be positioned within filter 124 during manufacturing.

Figure 2G:
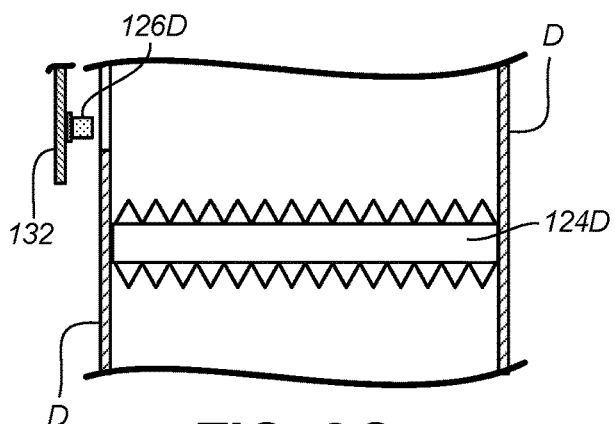

FIG. 2G shows an alternative embodiment in which filter 124D is remote from FQM device 126D. In the embodiment shown in FIG. 2G, FQM device 126D is adhered to a door 132, which is positioned in a wall of duct D. FIG. 2G is shown with door 132 removed from the side of duct D, and during normal usage FQM device 126D would be arranged within the plenum defined by duct D such as on the door or another wall surface.

One advantage to the arrangement shown in FIG. 2G is that FQM device 126D is usable with a variety of filters 124D, which can include pleated filters, electrets material filters, extruded polymer filters, electrostatic filters, or any other filter that exhibits any of a variety of mechanical or electrical characteristics that may not be compatible with the incorporation of an FQM device (such as due to electrical or mechanical interference). Furthermore, adhering FQM device 126D to door 132 facilitates placement of a window or other telemetry equipment to deliver signal from FQM device 126D to a position outside of duct D. In embodiments, a wire (not shown) can be arranged through door 132 so that signal can be passed through duct D even where duct D is metallic or otherwise impervious to wireless signal transmission. In various embodiments, as described above, FQM device 126D can be positioned upstream of, downstream of, or within filter 124. In one embodiment, FQM device 126D can be positioned on the inside of duct D by a user while door 132 is open by reaching within duct D and adhering FQM device 126D directly on a portion of the duct.

In such embodiments, FQM device 126D can have a mechanical fixation mechanism (such as a suction cup, screws, or by mating with a corresponding holder that has been previously positioned on the inside of duct D). Alternatively, FQM device 126D can be affixed to the inside of duct D using removable or permanent adhesive, or magnetically, by placing a magnet on the outside of duct that attracts a corresponding magnet in FQM device 126D. Various other mechanisms for affixing FQM device 126D to the inside of duct D could also be used, some of which (such as those described above) do not require a corresponding door (e.g., door 132) or aperture in duct D.

Figure 2H:
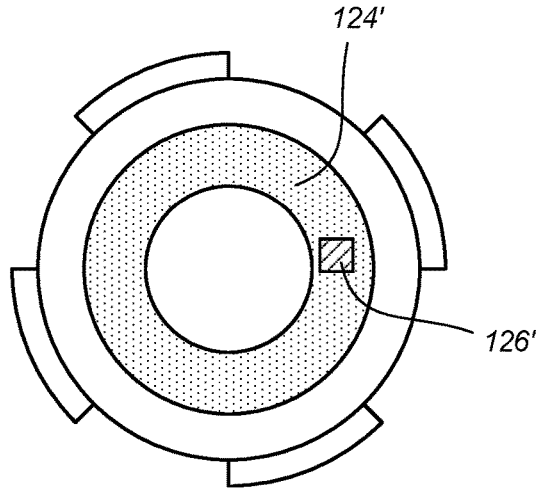

FIG. 2H is an alternative embodiment of a filter 124' that is usable in a fluid filtering context. For example, filter 124' can be used to filter water in a whole-house water filtering system, a refrigerator or other appliance, or a non-residential premises water line. FQM device 126' detects various properties of the fluid passing through filter 124', similar to FQM devices 126A-126D described above with respect to FIGS. 2A-2G.

In the embodiment shown in FIG. 2H, filter 124' surrounds FQM device 126' such that water flows through a portion of filter 124' before reaching FQM device 126', and then also passes through another portion of filter 124' after reaching FQM device 126'. In embodiments, the direction of water flow through filter 124' can be radially outward with respect to the annular cross-section shown in FIG. 2H, or radially inward with respect to the annular cross-section shown in FIG. 2H.

Figure 2I:
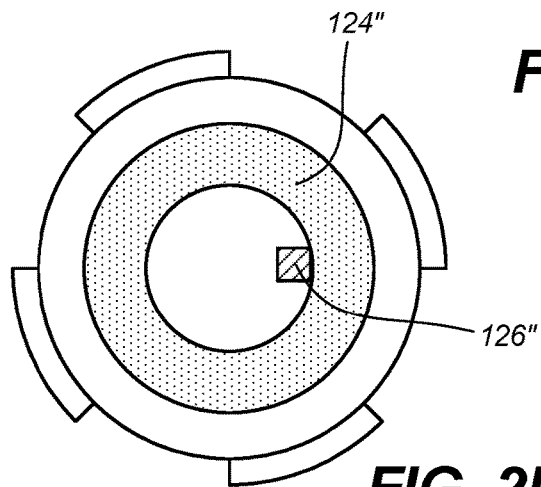

FIG. 2I shows an alternative embodiment in which FQM device 126" is arranged within the radially inner wall of filter 124". As described below with respect to other embodiments, such as FIGS. 4A-4C, the filter and housing can substantially fill the radially inner core section within the filter, or a portion thereof, to prevent relative movement between filter 124" and FQM device 126".

Figure 3A:
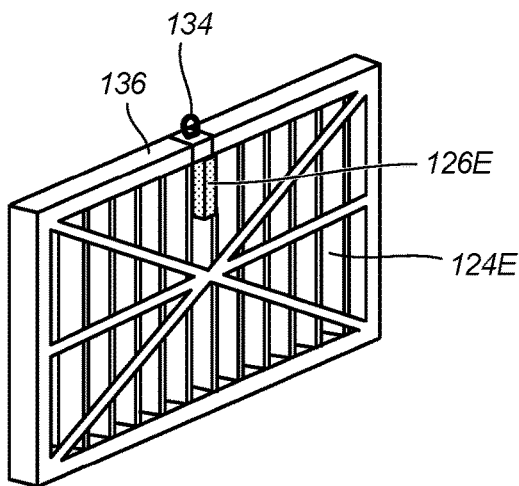
FIGS. 3A-3C are perspective views of filters according to embodiments including FQM subsystems for a heating, ventilation, and air conditioning (HVAC) system.
Figure 3B:
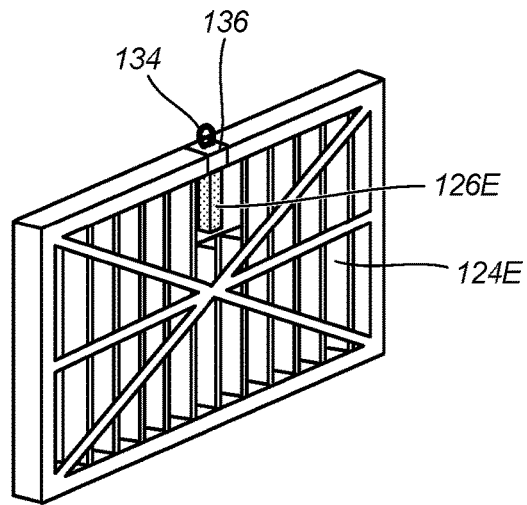
Figure 3C:
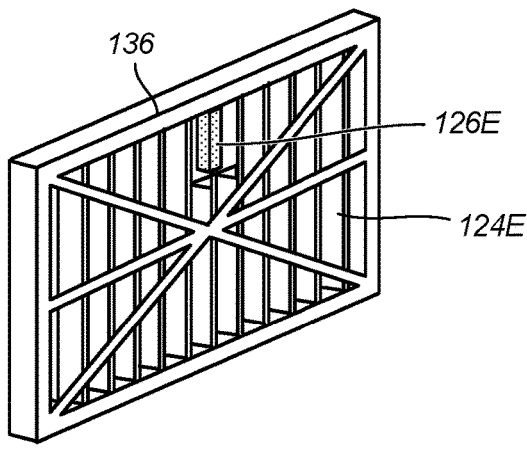

FIGS. 3A-3C depict three embodiments in which a pleated filter 124E is configured to receive an FQM device 126E. In FIG. 3A, FQM device 126E is arranged between two pleats of filter 124E and attached to handle 134. Handle 134 engages with a corresponding aperture defined in frame 136 of filter 124E. Handle 136 facilitates removal of FQM device 126E, which enables easy re-use of FQM device 126E. Often the useful lifespan of a filter (e.g., filter 124E) is very limited in an HVAC system; often less than 3-6 months. In some cases, such as in a household for a person with allergies or where a particularly high level of particulate matter is created, such as livestock housing, construction zones, or any premises in an area where unusually high levels of sand, dust, or smoke are present, the useful lifespan of a filter can be 1 month or less, or even 1 week or less. Nonetheless, FQM device 126E can be usable for the lifespan of multiple filters, such as a span of several years. Therefore, it can be beneficial to include handle 134 such that even when filter 124E is disposed of at the end of its useful lifespan, FQM device 126E can be retained and reused, such as by insertion of FQM device 126E into a similar aperture in a frame 136 of another filter 124E. Handle 134 can be made of a flexible or foldable material, in embodiments, such as a tape or film of polymer, braided fiber, or folding or hinged strap, so that the handle remains within the form factor of the filter 124E and the entire construction of the handle 134, filter 124E, and FQM device 126E can be inserted into a plenum having a typical, rectangular cross-section.

FIG. 3B is similar to FIG. 3A, except that FIG. 3B further shows the flattening of the pleats of filter 124E corresponding the location of FQM device 126E. FIG. 3C is similar to FIG. 3B, except that the aperture in frame 136 is absent. The structure shown in FIG. 3C could, in some embodiments, correspond to a system in which FQM device 126E is disposable and is replaced with each exchange of the filter. Alternatively, attachment or detachment mechanisms (not shown in FIG. 3C) can be incorporated into FQM device 126E and corresponding filters 124E. This facilitates the detachment of FQM device 126E from the filter 124E with each exchange.

Figure 3D:
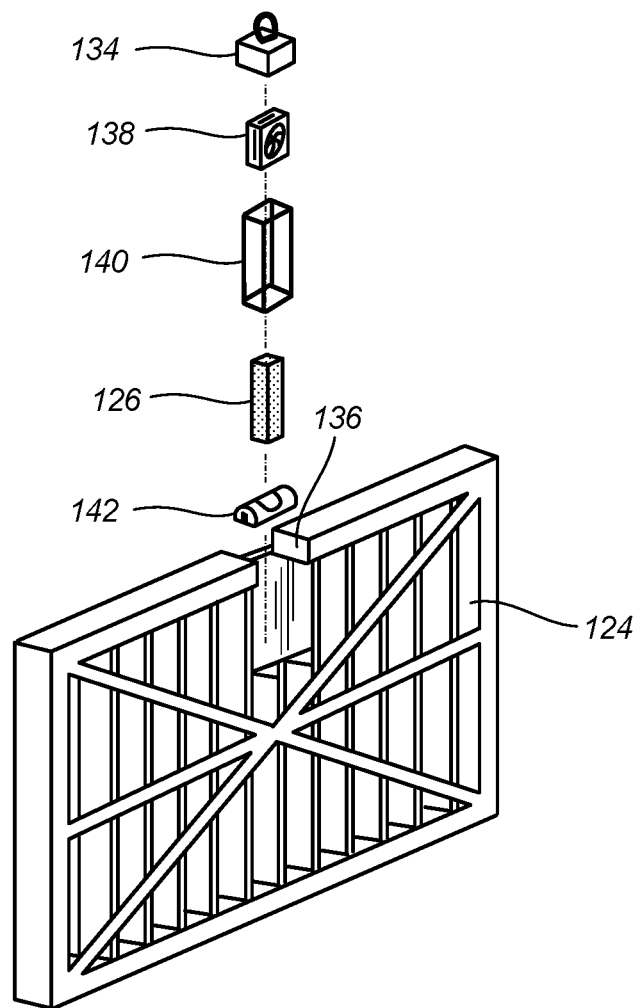
FIGS. 3D and 3E are exploded views thereof.

FIG. 3D is an exploded view of one embodiment of an FQM device 126 arranged in the form factor of a filter 124. As shown in FIG. 3D, handle 134 is coupled to an energy harvesting and airflow detection device 138 and a frame 140. FQM device 126 is arranged within frame 140, and is further coupled to an energy storage device 142.

Energy harvesting device 138, as shown in FIG. 3D, is a fan. Due to passage of air through filter 124 during use, mechanical energy can be harvested to power FQM device 126. Although depicted as a fan 138 in FIG. 3D, in alternative embodiments other energy harvesting systems could be used, such as systems that harvest static energy generated by the passage of an airstream or energy harvesting systems that are powered by change in temperature of a passing airstream.

Frame 140 is an optional component that houses FQM device 126 and, in embodiments, energy harvesting device 138 and energy storage device 142. Frame 140 can be a porous plastic or mesh, for example. In various embodiments, frame 140 permits the passage of air such that FQM device 126 can detect the properties thereof, while providing mechanical structure sufficient to prevent contact between the web or other material that makes up filter 124 from making contact with FQM device 126 (which could cause undesirable electrical or mechanical connections). Frame 140 can remain in filter 124 when the rest of the air quality monitoring componentry (e.g., handle 134, energy harvesting device 138, FQM device 126, and energy storage device 142) are removed. Thus, in embodiments, filter 124 and frame 140 can be replaced, while the relatively more complex or expensive components are reused. This is also beneficial in that components that include metals or other materials that incur an environmental cost to obtain are reused until the end of their useful lifespan, rather than being disposed of at each filter change.

Energy storage device 142 can be, for example, a battery, a capacitor, or a fuel supply. In one embodiment where energy storage device 142 is a battery, energy storage device 142 can be a lithium battery or other battery with a high energy storage density. In some embodiments, energy harvesting device 138 can recharge energy delivery device 142. Alternatively, where energy storage device 142 includes sufficient energy storage density, energy harvesting device 138 need not be included.

Figure 3E:
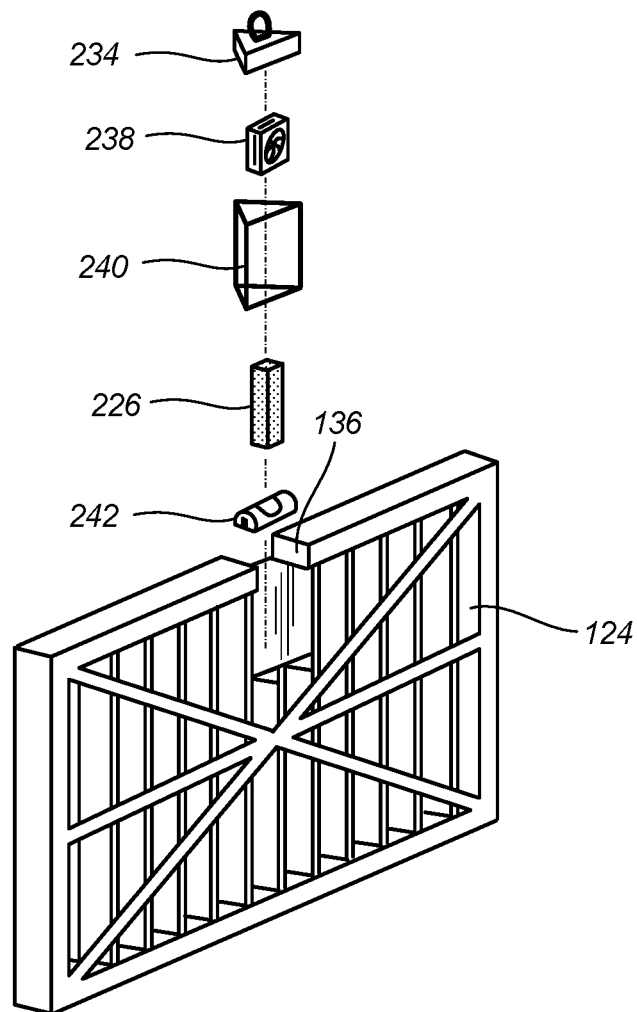

FIG. 3E is an alternative embodiment in which the shape of frame 240 has a triangular cross-section, rather than a square or rectangular cross-section as shown above with respect to FIG. 3D. The triangular shape shown in FIG. 3E can correspond with the shape of a gap created in the form factor of filter 124, between two adjacent pleats. In alternative embodiments, such as where the pleats of filter 124 are more closely spaced, other shapes of frame 240 could be used, such as a rhomboid or isosceles trapezoid, for example. The components of FIG. 3E are otherwise similar to the components previously described with respect to FIGS. 3A-3D, except that the reference numerals are iterated by a factor of 100.

Figure 4C:
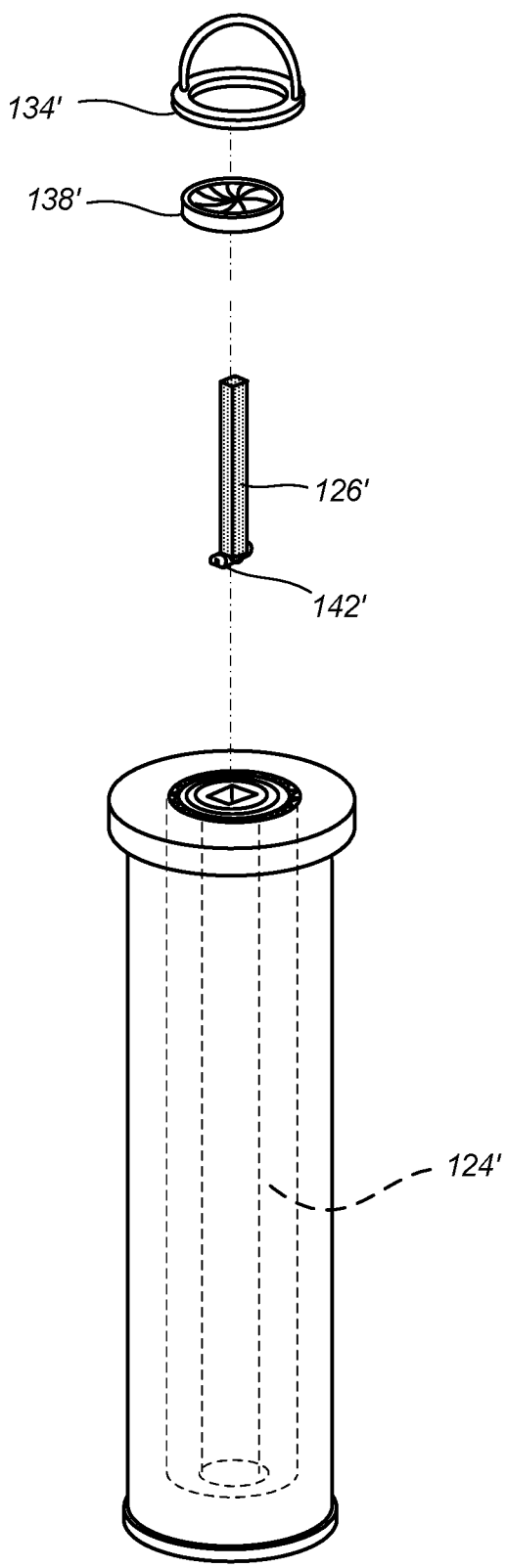
FIG. 4C is an exploded view of another embodiment.

FIGS. 4A and 4B are semi-transparent perspective views of liquid filter 124'. As shown in FIG. 4A, FQM device 126' is arranged within the form factor of filter 124', which is annular. FIG. 4B includes the same features as FIG. 4A, with the addition of handle 134' which facilitates easy removal of FQM device 126' from filter 124'. FIG. 4C is an exploded view further showing energy harvesting and fluid flow detection system 138'. Energy harvesting system 138', similar to energy harvesting system 138, collects energy from the movement of fluid passing through filter 124'. Energy harvested from the energy harvesting system 138' can be used either to directly power FQM device 126', or to charge battery 142' which can be drawn on by FQM device 126' as needed.

FIG. 4C differs from FIGS. 4A and 4B in that FQM device 126' is positioned along the center of the overall system. That is, rather than being arranged within a cutout of filter 124', FQM device 126' is arranged inside the radially inner wall of filter 124'. While FQM device 126' is still within the form factor of filter 124' (i.e., within the cylinder defined by the outer edge of filter 124'), arranging FQM device 126' such that it does not need a corresponding cutout in filter 124' can facilitate use of FQM device 126' with filters that are not specifically designed to receive it. Furthermore, the total quantity of filter media is not reduced in such embodiments.

In embodiments, FQM devices can be mounted in proximity to existing fluid filter to eliminate or minimize the need for physical changes to the fluid handling system, such as mechanical modification, routing of power to the FQM device, or routing of wiring or telemetry components. FQM devices can therefore be arranged within the form factor of the fluid filter itself, or such that they are accessible from the fluid filter access point, in various embodiments. As described above, FQM devices can be powered by battery or other energy storage systems, and optionally by energy harvesting of the fluid motion of the surrounding fluid. Power use requirements of the FQM devices described herein can be minimized by use of low power componentry, as described in more detail below with respect to FIG. 5, and intelligent or intermittent operation of the electronics.

Figure 5:
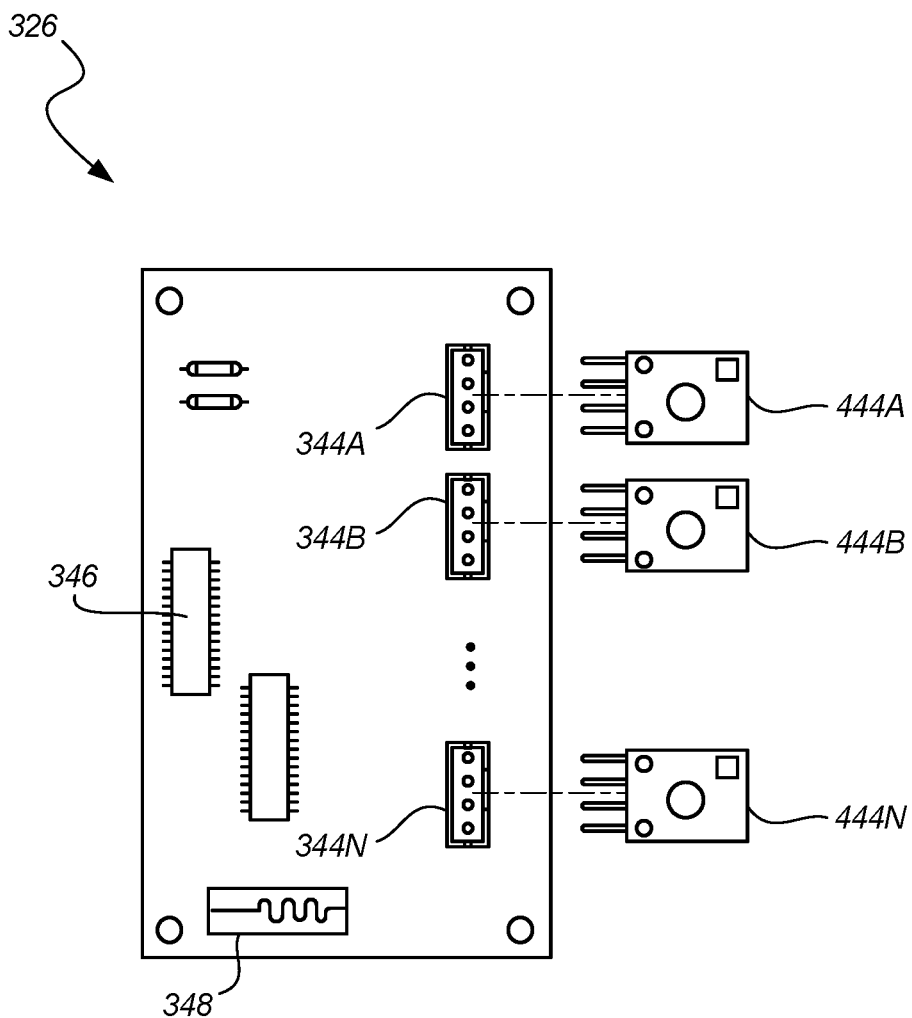
FIG. 5 is a plan view of an FQM device according to an embodiment.

FIG. 5 is a plan view of an FQM device 326. FQM device 326 is a generic FQM device, in that it is not necessarily limited to HVAC, water, or any other particular fluid monitoring. FQM device 326 includes ports 344A, 344B, . . . 344N. Each of the ports 344A, 344B, . . . 344N receives a corresponding sensor 444A, 444B, . . . 444N in the embodiment shown in FIG. 5. In alternative embodiments, not all of the ports 344A, 344B, . . . 344N need be connected to a corresponding sensor 444A, 444B, . . . 444N. Rather, some ports 344A, 344B, . . . 344N could remain empty.

Each of the sensors 444A, 444B, . . . 444N can be configured for detection of a particular type of particulate, order, or gas. For example, one sensor (444A, 444B, . . . 444N) could be configured to detect the presence of a high level of particulate matter in a certain size range, and another sensor (444A, 444B, . . . 444N) could detect particulate matter in a second size range. For example, smoke may have a different particulate size than pet dander, which can in turn have a different particulate size than dust. Different sensors (444A, 444B, . . . 444N) can detect particulates having different chemistry, such as polar, non-polar, or ionized matter. In some embodiments, at least one sensor (444A, 444B, . . . 444N) can be configured to detect the presence of volatile organic compounds. In some embodiments, at least one sensor (444A, 444B, . . . 444N) can be configured to detect the presence of radon. In some embodiments, at least one sensor (444A, 444B, . . . 444N) can be configured to detect the presence of carbon monoxide. In some embodiments, at least one sensor (444A, 444B, . . . 444N) can be configured to detect the presence of airspeed velocity past the sensor, which can be indicative of remaining filter life. In some embodiments, at least one sensor (444A, 444B, . . . 444N) can be configured to detect the presence of moisture level.

Logic subsystem 346 can compile the data from each of the sensors (444A, 444B, . . . 444N) and send the compiled data to telemetry package 348, which can include an antenna in one embodiment. Logic subsystem 346 can, in some embodiments, be sophisticated enough to make determinations regarding the presence or absence of critical substances, such as carbon monoxide, that warrant urgent transmission via telemetry 348. Likewise, logic subsystem 346 can be programmed to determine when some or all of the sensors (444A, 444B, . . . 444N) can be shut off or switched to a standby mode to reduce power usage.

Telemetry package 348 can, as described above, be a wired or wireless device for transmission of data regarding health of the filter, or quality of fluid passing by FQM device 326. In various embodiments, telemetry package 348 can be autonomous. An autonomous transmission package is a package that is configured to send data to a network or networked device, without being prompted. For example, the network could be a WiFi network, a Bluetooth network, or any other wired or wireless network. Telemetry package 348 has consistent access to power, unlike an RFID or NFC system that harvests power from an incoming prompt signal. Therefore, even when there is no prompting device, telemetry package 348 can continue to monitor fluid quality without interruption. This autonomous transmission (and, for that matter, detection) feature is not limited to any particular embodiment described herein, but rather can be a feature of any water, air, or other fluid monitoring system described herein. In some embodiments, the consistent availability of monitoring and transmission can be used to implement an alerting component. The alerting component, upon detection of an exceeded predetermined threshold of a particular substance or type of substance, can autonomously send an alert that is delivered to a user, such as to the user's cell phone by text message, dedicated mobile application, or other alerting device or method, or to an alarm system in the house such as a networked carbon monoxide or smoke detector. In other embodiments, too little of a monitored substance (rather than too much) can also be the trigger for an alerting unit to issue an alarm (such as low oxygen levels).

Figure 6:
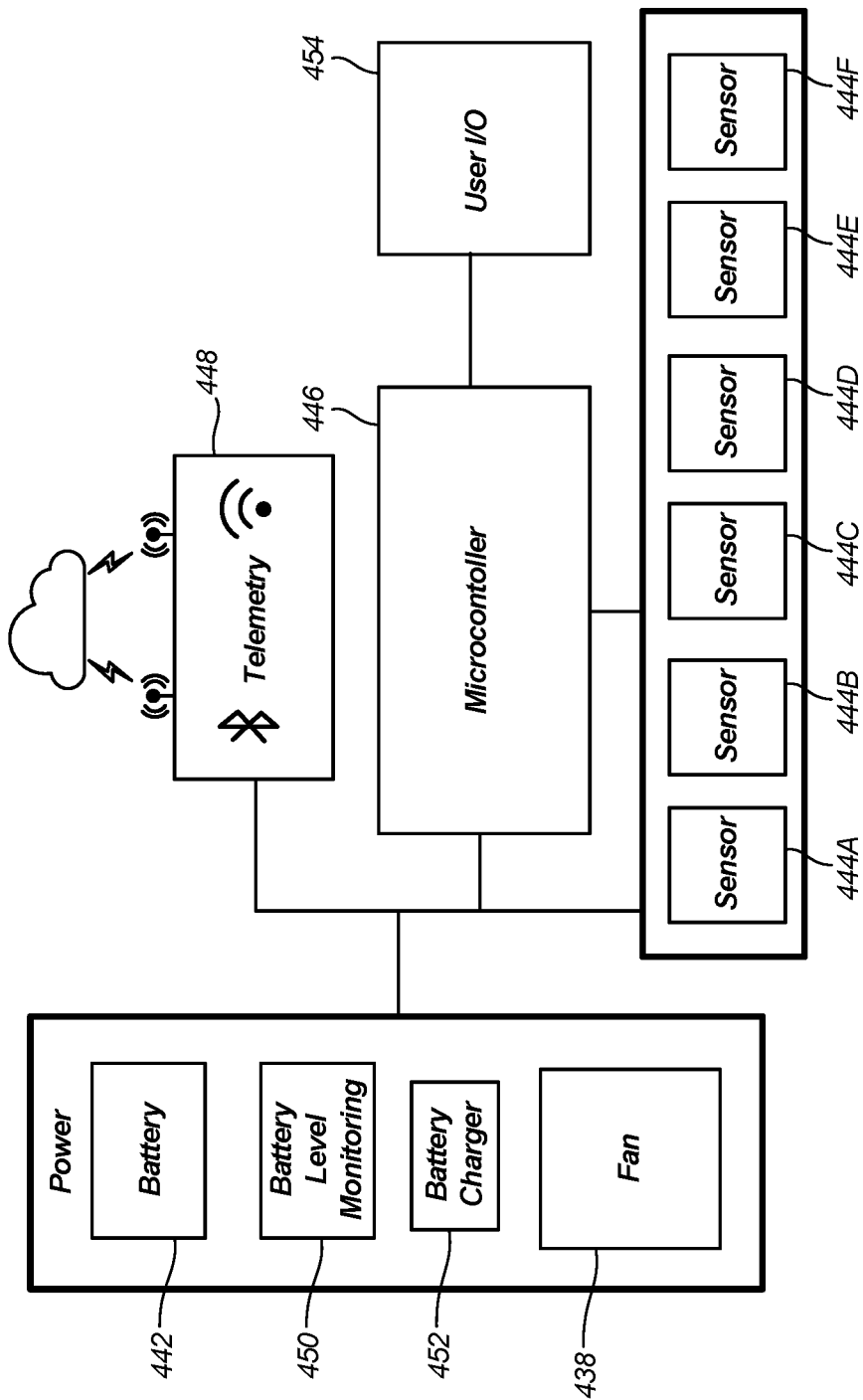
FIG. 6 is a block diagram of an electrical and mechanical embodiment of an FQM device.

FIG. 6 is a block diagram of an electrical and mechanical embodiment of an FQM system including telemetry. The FQM system, which can be used in any of the embodiments described above, includes a microcontroller 446 coupled to a plurality of sensors 444A-444F, similar to the description above with respect to FIG. 5. Microcontroller 446 is also coupled to an optional user input/output interface 454. The input/output interface 454 can be used, in some embodiments, for a user to interact directly with microcontroller 446. For example, a user may reference a set of onboard visual indicators (e.g., LEDs to check the operational status of the FQM) or may be prompted by an onboard audio indicator (e.g., a speaker to sound an alert when a detected threshold has been exceeded). In another example, a user might press a switch on the FQM in order to initiate installation of the device (e.g., connection of the FQM to the WiFi system within a structure, or other installation initiation triggers or events).

Microcontroller 446 is also coupled to telemetry system 448 which sends relevant information (or, in other embodiments, all measured or detected information) to a network, a storage device, a user device, or the cloud, in various embodiments.

The FQM system of FIG. 6 further includes a power subsystem that can include battery 442, battery level monitoring module 450, battery charging module 452, and fan 438, which can be an energy harvesting device or detect fluid flow as described above in more detail.

Figure 7:
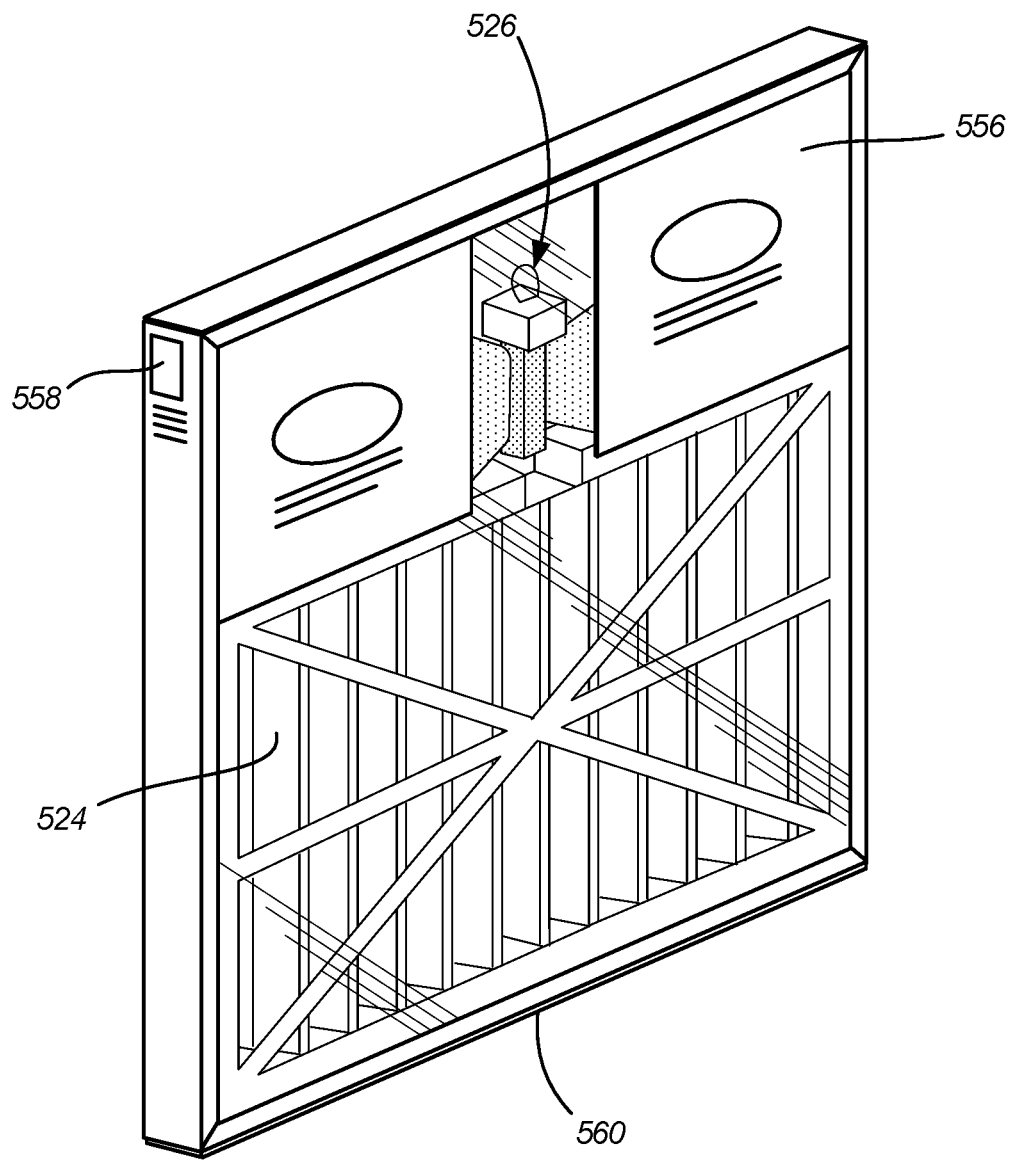
FIG. 7 is a perspective view of a kit including a filter, FQM device, and instructions, according to an embodiment for use in an HVAC system.
Figure 8:
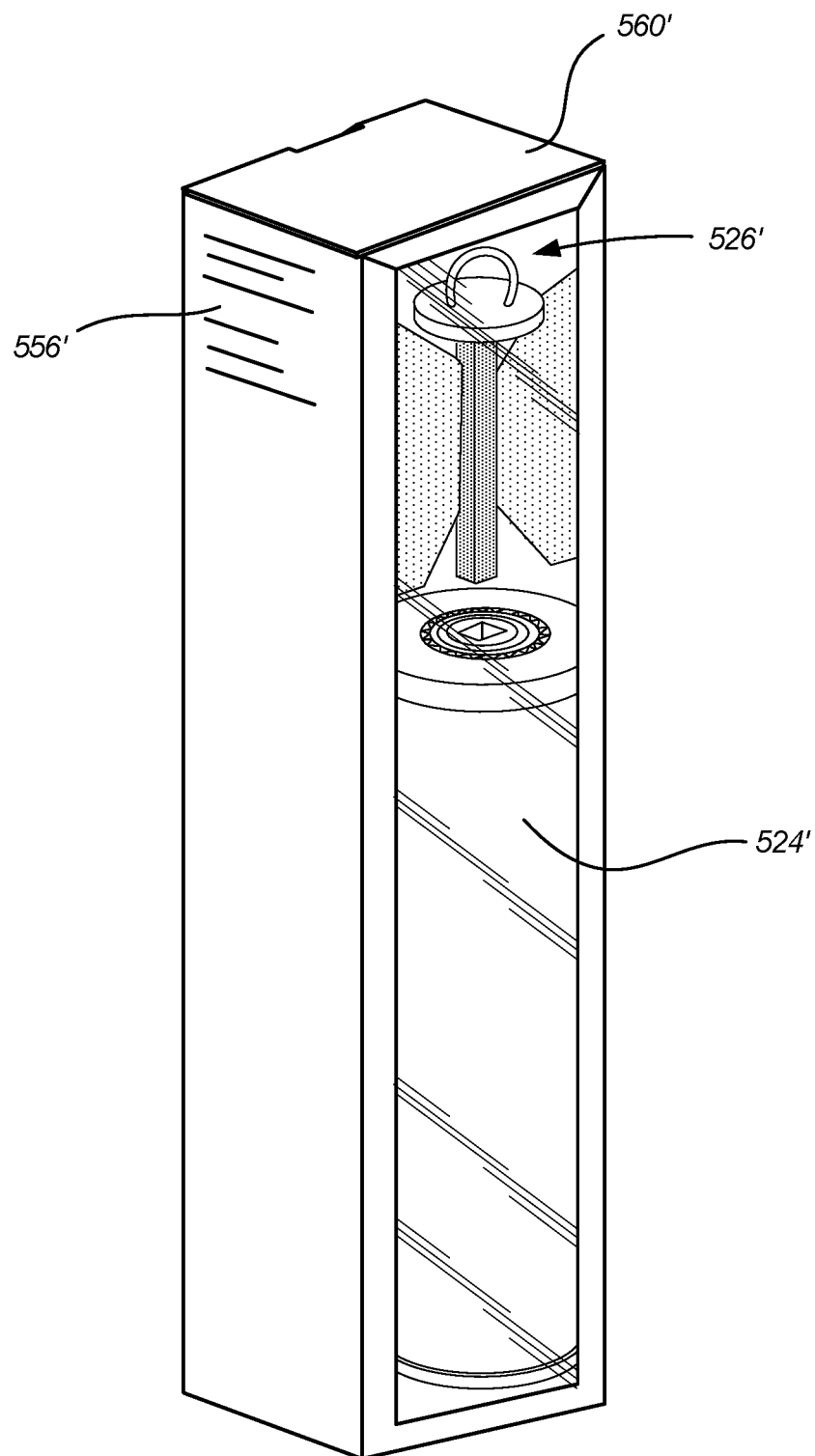
FIG. 8 is a perspective view of a kit including a filter, FQM device, and instructions, according to an embodiment for use in a water filtration system.

FIG. 7 is a kit that can be used for HVAC air quality monitoring by a retail customer. The kit includes filter 524, FQM device 526, instructions 556, and labeling 558. All of these components are held together with packaging 560. As shown in FIG. 7, the kit includes all of the components and necessary instructions to set up air quality monitoring at home by a retail customer. In various alternative embodiments, different combinations of components could be combined together within a kit. For example, in embodiments, a user may wish to purchase multiple filters at once, even though only one FQM device is needed (because the FQM device can be used with multiple filters sequentially). In still further embodiments, a replacement part kit can include only filters, each having a keyed engagement slot similar to the apertures described above with respect to 3A, 3B, and 3D. FIG. 8 is similar to FIG. 7, expect that the kit shown therein relates to a packaged water filter unit having an FQM device 526' and filter 524' in packaging 560' with instructions 556'. In still further embodiments, a kit can include only an FQM device (such as a device having an air quality sensor, water quality sensor, or other fluid quality sensors or combination thereof as described above) with packaging that includes instructions for setup and use. In still further embodiments, a kit could include a variety of sensors, transmission modules, or other add-on devices that can be connected to an FQM device, such as those previously described with respect to reference numbers 444A-444N, above.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A liquid quality monitoring system comprising:
   a filter made of a filter medium, the filter defining a form factor that is a cylindrical toroid extending about a central axial direction, the filter having an annular cross-section orthogonal to the central axial direction and configured to provide liquid filtration;
   a sensor package arranged within the form factor, the sensor package extending primarily in an axial direction that is parallel to the central axial direction of the cylindrical toroid, the sensor package extending orthogonal to an expected direction of liquid flow through the filter medium, wherein the sensor package is configured to detect at least one liquid quality factor, the sensor package including at least one sensor configured to detect one or more of contaminants, particles, flavors, or bacteria levels; and
   a transmitter electronically coupled to the sensor package, the transmitter including an antenna for autonomous wireless transmission of the detected at least one liquid quality factor.

2. The liquid quality monitoring system of claim 1, wherein the filter is a water quality monitoring system having a cross-section matching a cross-section of a whole-house filter plenum.

3. The liquid quality monitoring system of claim 1, further comprising:
   a power subsystem coupled to the sensor package and the transmitter to provide access to continuous electrical power thereto, and
   a logic system configured to power the sensor package intermittently.

4. The liquid quality monitoring system of claim 2, wherein the at least one liquid quality factor includes one or more of flavors, particles, or bacteria level.

5. The liquid quality monitoring system of claim 1, wherein the sensor package is configured to be insertable and removable from the form factor of the filter.

6. The liquid quality monitoring system of claim 2, further comprising an alerting component configured to provide an alert when the sensor package detects an exceeded threshold of one of the at least one liquid quality factor.

7. The liquid quality monitoring system of claim 3, wherein the power subsystem comprises an energy harvesting element configured to harvest energy generated by passage of a liquid stream or by change in temperature of the passing liquid stream.

8. The liquid quality monitoring system of claim 3, wherein the power subsystem comprises a battery and the sensor package is configured to operate intermittently.

9. The liquid quality monitoring system of claim 1, wherein the transmitter is configured to connect to a device in proximity to the sensor package.

* * * * *